United States Patent
Chandrasekaran et al.

(10) Patent No.: US 7,536,525 B2
(45) Date of Patent: May 19, 2009

(54) VIRTUAL MACHINE HOT CLONING INCLUDING FREEZING AND UNFREEZING MEMORY IN A DISTRIBUTED NETWORK

(75) Inventors: Balasubramanian Chandrasekaran, Austin, TX (US); Timothy E. Abels, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 362 days.

(21) Appl. No.: 10/984,397

(22) Filed: Nov. 9, 2004

(65) Prior Publication Data

US 2006/0101189 A1 May 11, 2006

(51) Int. Cl.
G06F 9/455 (2006.01)
G06F 15/16 (2006.01)
G06F 15/167 (2006.01)
G06F 21/00 (2006.01)
G06F 13/00 (2006.01)
G06F 13/28 (2006.01)
G06F 11/00 (2006.01)

(52) U.S. Cl. ............... 711/165; 718/1; 709/201; 709/213; 711/147; 711/6; 714/15

(58) Field of Classification Search ............ 711/165; 718/1
See application file for complete search history.

(56) References Cited

U.S. PATENT DOCUMENTS

| | | | |
|---|---|---|---|
| 5,561,784 A * | 10/1996 | Chen et al. | 711/157 |
| 6,167,253 A | 12/2000 | Farris et al. | 455/412 |
| 6,513,059 B1 | 1/2003 | Gupta et al. | 709/202 |
| 6,643,650 B1 | 11/2003 | Slaughter et al. | 707/10 |
| 6,789,077 B1 | 9/2004 | Slaughter et al. | 707/10 |
| 6,789,126 B1 | 9/2004 | Saulpaugh et al. | 709/245 |
| 6,789,252 B1 | 9/2004 | Burke et al. | 717/100 |
| 6,792,466 B1 | 9/2004 | Saulpaugh et al. | 709/229 |
| 6,850,953 B1 * | 2/2005 | Deshpande et al. | 707/103 Y |
| 7,093,086 B1 * | 8/2006 | van Rietschote | 711/161 |

(Continued)

OTHER PUBLICATIONS

Optimizing the migration of virtual computers vol. 36, Issue SI (Winter 2002) pp. 377-390 Year of Publication: 2002 Constantine P. Sapuntzakis et al.*

(Continued)

*Primary Examiner*—Stephen C Elmore
*Assistant Examiner*—Marwan Ayash
(74) *Attorney, Agent, or Firm*—Baker Botts L.L.P.

(57) ABSTRACT

A system and method for hot cloning in a distributed network is disclosed. In one embodiment, a method for cloning a virtual machine from a source system to a target system includes freezing writes to a storage file having storage blocks such that subsequent writes create new storage blocks for the original virtual machine. The method further including freezing writes to a memory content such that subsequent writes store in buffers. The method further including copying the memory content onto the target system wherein the copied memory content creates a clone. The method further including unfreezing the memory content by merging the writes stored in the buffers and unfreezing the writes to the storage file such that subsequent writes take place normally. The method further including configuring the clone based on the target system. The method further including creating a new storage block for any writes to the storage file whereby the new storage block is not shared.

17 Claims, 2 Drawing Sheets

U.S. PATENT DOCUMENTS

| | | | |
|---|---|---|---|
| 2002/0013802 A1* | 1/2002 | Mori et al. | 709/1 |
| 2003/0033344 A1* | 2/2003 | Abbott et al. | 709/1 |
| 2004/0010787 A1* | 1/2004 | Traut et al. | 718/1 |
| 2004/0221290 A1* | 11/2004 | Casey et al. | 718/104 |
| 2005/0268298 A1* | 12/2005 | Hunt et al. | 718/1 |

OTHER PUBLICATIONS

Process migration vol. 32, Issue 3 (Sep. 2000) pp. 241-290 Year of Publication: 2000 Dejan S. Miloji čić et al.*

"Optimizing the migration of virtual computers" by Constantine P. Sapuntzakis et al. vol. 36, Issue SI (Winter 2002) pp. 377-383 Year of Publication: 2002.*

* cited by examiner

VIRTUAL MACHINE HOT CLONING INCLUDING FREEZING AND UNFREEZING MEMORY IN A DISTRIBUTED NETWORK

TECHNICAL FIELD

The present disclosure relates generally to information handling systems and, more particularly, to a system and method for hot cloning in a distributed network.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, including servers and workstations, are often grouped into distributed computer networks. These networks typically include a client-server architecture in which the servers access storage, including shared storage between the servers, in response to requests from client computers of the network.

The servers of a distributed network may include one or more virtual operating systems such as a virtual machine running on the host operating system and the host software of the server. Multiple virtual machines may be included on a single physical server. The presence of one or more virtual machines on a single physical machines provides a separation of the hardware and the software of the compute system. Each virtual machine could be dedicated to the task of handling a single function. As an example, one virtual machine could be mail server, while another virtual machine present on the same physical server could be a file server.

In some instances, a copy or a clone of a virtual machine is created for an active file system or application. Typically, the creation of a clone usually includes shutting down the entire virtual machine including the application and operating system prior to cloning such that a copy of the data is created.

Because cloning requires that the application and operating system are shut down, the application will be unavailable for use until the cloning operation is completed, which is usually dependent on the size of the virtual disk file. For example, referring to FIG. 1A, a cloning method copies the application and operating system in which a virtual machine including an application and operating system is moved from a first server 1a to second server 1b. Servers 1a and 1b form a part of shared network system 2 such that the virtual machine is hosted generally on a server 1a behind virtualization layer 4. During cloning 7a, the original application and operating system 5 is removed from server 1a and copied to server 1b at virtual machine 6. Since a copy of the application and operating system is made, the process is time consuming and not performed in real-time or instantaneously.

Referring to FIG. 1B, a migration method is used to move a virtual machine including an application and operating system from a first server 1a to second server 1b. During migration 7b, the original application and operating system 5 is removed from server 1a and copied to server 1b at virtual machine 6 such that the virtual machine does not exist on server 1a after it is moved to server 1b. In some instances, the migration technique may set up pointer switch 8b to set the new location on server 1b in lieu of pointer switch 8a.

SUMMARY

Therefore, a need has arisen for a system and method for hot cloning in a distributed system.

In accordance with one embodiment of the present disclosure, a method for cloning a virtual machine from a source system to a target system in an information handling system including freezing writes to a shared storage file having storage blocks of an original virtual machine such that subsequent writes create new storage blocks for the original virtual machine. The method further comprising freezing writes to a memory content for the original virtual machine such that subsequent writes store in buffers. The method further including copying the memory content onto the target system wherein the copied memory content creates a clone of the original virtual machine. The method further including unfreezing the memory content of the original virtual machine by merging the writes stored in the buffers and unfreezing the writes to the storage file such that subsequent writes take place using "copy on write". The method further including configuring the clone of the virtual machine based on the target system. The method further including creating a new storage block for any writes to the storage file whereby the new storage block is not shared. The target system may be the same as the source system.

In a further embodiment, an information handling system includes a plurality of processors coupled to a processor bus and a memory coupled to the processor bus. The information handling system further includes a shared storage system operably coupled to the processors and the memory. The shared storage system including a target system and a source system having a virtual machine. The virtual machine including a storage file having a plurality of storage blocks. The processors operable to execute instructions for cloning the virtual machine from the source system to the target system including freezing writes to the storage file wherein subsequent writes create new storage blocks for the virtual machine. The processors further executing instructions including freezing a memory content for the virtual machine whereby subsequent writes are placed in buffers. The processors further executing instructions including copying the memory content onto the target system to create a clone. The processors further executing instructions including unfreezing the memory content of the virtual machine by merging the writes placed in the buffers and unfreezing the writes to the storage file. The processors further executing instructions including configuring the clone based on the target system. The processors further executing instructions including creating a new storage block for any writes to the storage file whereby the new storage block is not shared.

In accordance with a further embodiment of the present disclosure, a computer-readable medium having computer-executable instructions for performing a method of cloning a virtual machine from a source system to a target system in an information handling system including instructions for stopping writes to a storage file having storage blocks of an original virtual machine and freezing writes to a memory content for the original virtual machine such that subsequent writes store in buffers. The computer-readable medium further including instructions for copying the memory content including processor state and input/output (I/O) state onto the target system wherein the copied memory content creates a clone of the original virtual machine. The computer-readable medium further including, following the instructions for copying, instructions for unfreezing the writes to the storage file and unfreezing the memory content of the original virtual machine by merging the writes stored in the buffers. The computer-readable medium further including instructions for configuring the clone of the virtual machine based on the target system. The computer-readable medium further including instructions for creating a new storage block for any writes to the storage file whereby the new storage block is not shared.

One technical advantage of the present disclosure is a real time hot migration of a virtual machine. Because the cloning process copies the frozen memory content without the need for copying the storage file, the process may reduce the copying time from hours to seconds or less. The storage file may become a shared storage file with all subsequent writes creating a new block unique to the virtual machine causing the change.

Another technical advantage of the present disclosure is that the clone may be created without taking the system down. Because the cloning process merely freezes writes to storage files and memory, the process may be performed while the distributed storage system is still operating. Any changes to the virtual machine may be updated in a later process. Thus, the method allows the system to remain operational during the cloning process.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 6, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1A:
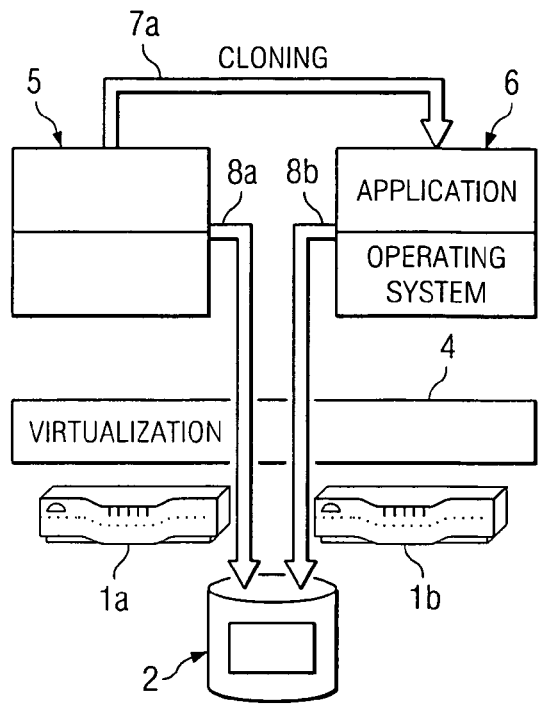
FIGS. 1A and 1b are examples of prior art cloning and migration methods used in a shared system.
Figure 1B:
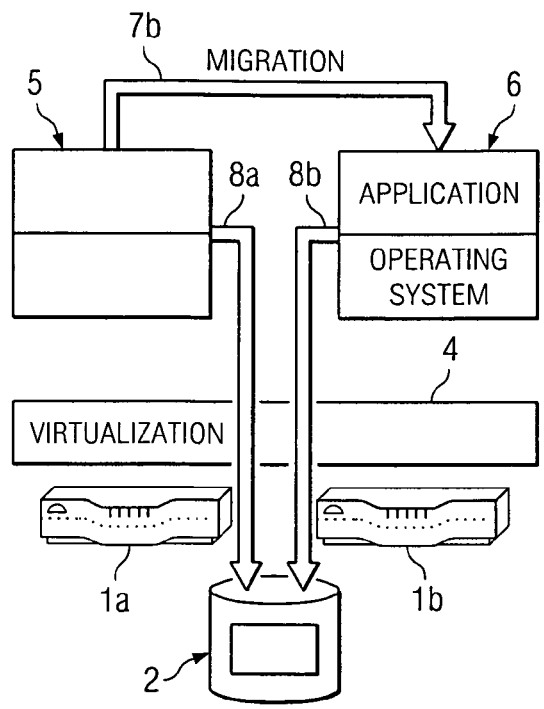
Figure 2:
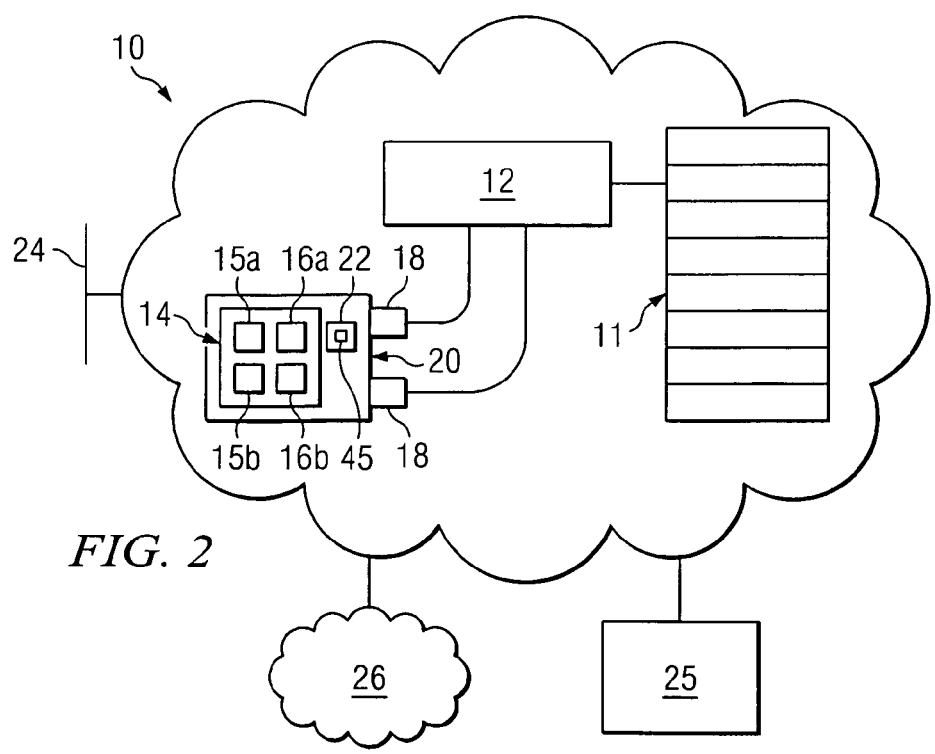
FIG. 2 is a block diagram showing an example embodiment of a distributed network system, according to teachings of the present disclosure.

FIG. 1 is a block representation of distributed network system 10 which is one type of information handling system. One example of distributed network system 10 includes a storage area network (SAN) that interconnects various computer components to move data between server 20 and storage resources 11. However, in other embodiments, distributed network system may include any shared storage such as a network attached storage (NAS).

Typically, a SAN includes storage resources 11, switch 12, host bus adapters 18 and servers 20. Storage resources 11 such as a storage array may also include hard disks, RAID array, tape drive or similar devices to store data. Generally in large SAN, several storage resources 11 are interconnected via a network such that all of the computer components can be shared across the network. An example of storage resource 11 includes a PowerVault 660F Storage Array manufactured by Dell Computer Corporation.

Switch 12 allows the computer components to provide communications with the different components connected to distributed network system 10. As such, switch 12 acts as a hub that provides a common connection for separate communications lines in a network. In general, switch 12 operates to forward communications to a particular device in distributed network system 10 based on a port address associated with the device. In one instance, switch 12 interconnects one or more storage resources 11 with one or more servers 20.

Host bus adapters (HBAs) 18 operate to handle controller specific aspects of a device driver by interfacing between a target driver and the disk controller. For example, when a request is received to retrieve information from a specific location in storage resource 11, HBA 18 acts as the interface by reading the information and passing on the results to the target driver. Typically, HBAs 18 interface between server 20 and storage resource 11 via switch 12.

Server 20 may form a part of the SAN that responds to commands from users or clients 26 on distributed network system 10. Server 20 preferably includes one or more microprocessors such as central processing unit (CPU) 14. CPU 12 may include processor 16a for handling integer operations and coprocessor 16b for handling floating point operations. CPU 21 is preferably coupled to cache, such as L1 cache 15a and L2 cache 15b via a frontside bus (not expressly shown). Server 20 preferably couples CPU 21 to memory 22 generally via memory controller (not expressly shown). Main memory 22 of dynamic random access memory (DRAM) modules may be divided into one or more areas such as system management mode (SMM) memory area (not expressly shown).

Client 26 may access server 20 via the Internet or, in other embodiments, from a local area connection (LAN) 24. A network administrator may connect to distributed network system 10 via management station 25. At management station 25, the administrator may monitor and perform system diagnosis and troubleshooting. Additionally, the administrator may interface with individual components that are shared on distributed network system 10.

In some instances, storage resources 11 include a plurality of hard disk drives (as shown below in more detail) that may run virtualization layer 46 that may host virtual machine 30. Typically, virtual machine 30 may include an operating system (OS) and/or an application. However, in some embodiments, virtual machine 30 may or may not include an OS.

Figure 3:
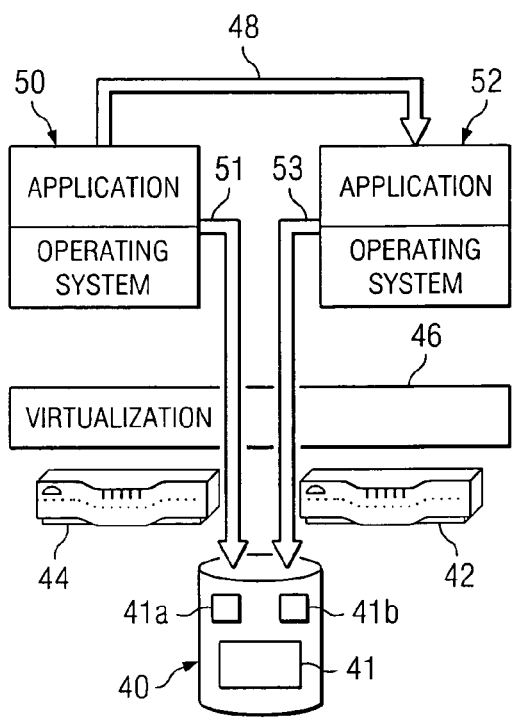
FIG. 3 is a block diagram showing an example embodiments of a system operable to use a "hot" cloning method for creating a clone of an application and operating system, according to teachings of the present disclosure.

Referring to FIG. 3, storage resources 11 may include shared storage 40 that communicatively couples to storage such as local or external storage. For example, local storage such as storage drives 42 and 44 may form a part of shared storage 40. In some instances, storage drives may include hard disk drives. However, some or all data may alternatively be stored in external storage.

Virtualization layer 46 typically runs on storage drives 42 and 44 to allow the drives to host a virtual machine such as application and operating system (OS) 50. Generally, application and OS 50 run behind virtualization layer 46. Typically, application and OS 50 use pointer 51 to create an index location or physical location on shared storage 40. Pointer 51 usually designates the location or address of application and OS 50. As such, each call to application and OS 50 will use pointer 51 to locate and communicate with application and OS 50.

Virtual machine such as application and OS 50 may further include storage file 41. Typically, application and OS 50 use memory for processing transactions. However, as the virtual machine completes transactions the results are stored in blocks of storage file 41. Although processed or completed transactions is typically results in a write operation, application and OS 50 may perform write operations at any time.

During operation of information handling system 10, one or more copies of application and OS 50 may be desired. For example, copies may be needed for backup purposes. Alternatively, a copy may be used to operate application and OS 50 simultaneously to increase efficiency. Thus, in a hot cloning technique (described below in more detail), clone of application and OS 52 may be created by copying application and OS 50 via cloning path 48. As such, clone of application and OS 52 may exist on shared storage 11 as indicated by pointer 53.

Clone of application and OS 52 preferably is cloned in real-time and may exist on storage drive 42. However, clone 52 may reside at any location within shared storage 40. Once cloned, clone 52 may begin to function and operate similar to application and OS 50. As such, clone 52 may begin to complete transactions or otherwise desire to save writes to a storage file such as in a copy-on-write technique.

However, because application and OS 50 and clone 52 may use storage file 41 simultaneously, application and OS 50 may begin to write new block to secondary storage files 41a.

Similarly, clone 52 may create secondary storage file 41b for writes to new blocks. As each copy (the original application and OS 50 or clone 52) creates new blocks of storage file 41, each copy will begin to create a unique storage file (e.g., secondary storage file 41a and 41b) for that copy in a technique commonly referred to as "copy-on-write."

Figure 4:
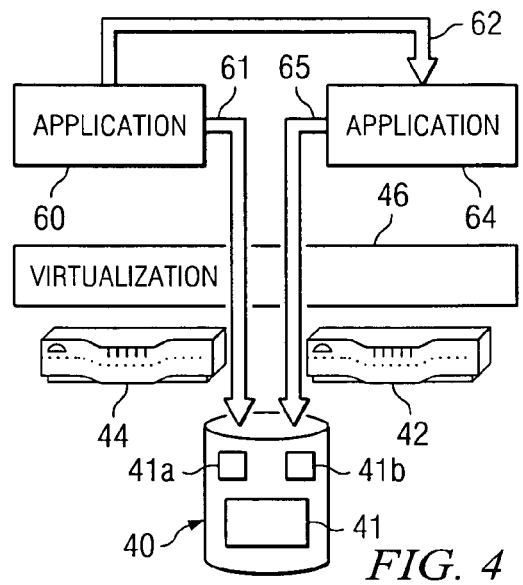
FIG. 4 is a block diagram showing an example embodiments of a system operable to use a "hot" cloning method for creating a clone of an application, according to teachings of the present disclosure.

In other embodiments, the virtual machine includes application 60 that may be cloned to the new location without an operating system as shown in FIG. 4. For example, application 60 may run behind virtualization layer 46 having index pointer 61. Following the hot cloning process as indicated generally at 62, clone application 64 may be present in shared storage 40 as directed by index pointer 65.

Figure 5:
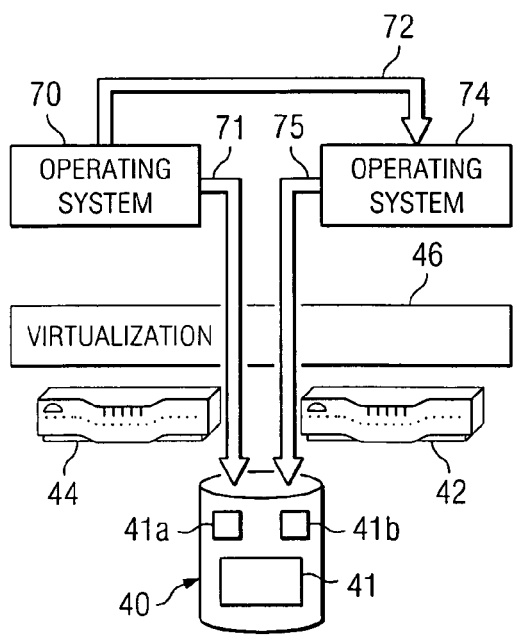
FIG. 5 is a block diagram showing an example embodiments of a system operable to use a "hot" cloning method for creating a clone of an operating system, according to teachings of the present disclosure.

In another embodiment, the virtual machine includes operating system 70 that may be cloned to the new location without an application as shown in FIG. 5. For example, operating system 70 may run behind virtualization layer 46 having index pointer 71. Following the hot cloning process as indicated generally at 72, clone operating system 74 may be present in shared storage 40 as directed by index pointer 75.

Figure 6:
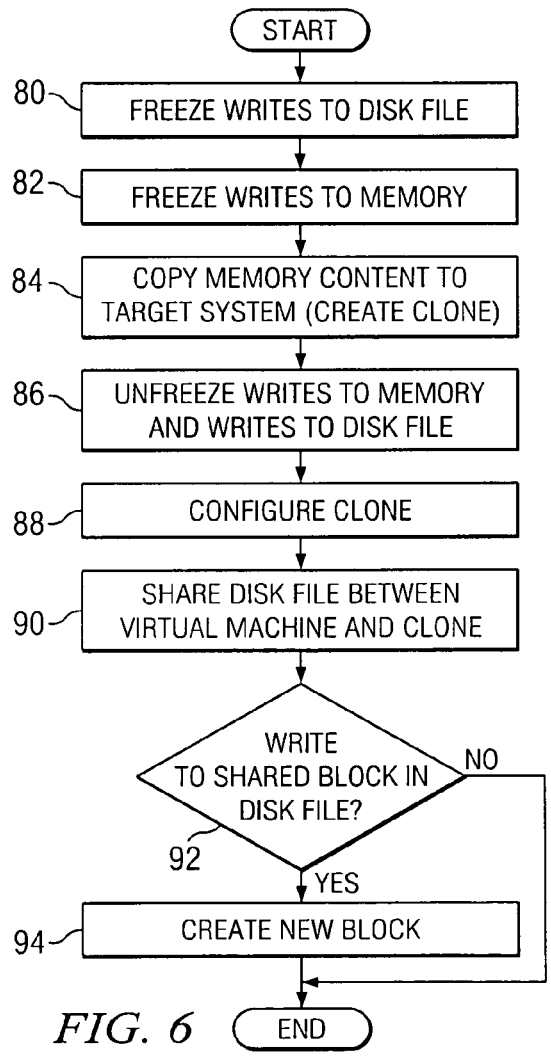
FIG. 6 is a flowchart of a method for cloning a virtual machine in a distributed network system, according to teachings of the present disclosure.

FIG. 6 is a flowchart of a method for cloning a virtual machine in distributed network system 10. Hot cloning or cloning in real time generally includes a shared storage 11 in which the virtual machine running behind virtualization layer 46 has completed open transactions. However, if any open transactions are present, the method may replicate these transactions on all the cloned machines.

When hot cloning the virtual machine from a source system to a target system having shared storage 11, the method stops or freezes all writes to storage file 41 as shown at block 80. As described above, subsequent writes to storage file 41 by the original virtual machine may create new storage blocks of storage file 41 for both the original and clone. Generally, the freezing of writes begins with the slowest writes to storage and continues to the faster writes to storage such as a hard disk drive or other storage media.

Following the freeze of writes, the method typically freezes or stops all writes to memory as shown at block 82. Once frozen, all subsequent writes to memory may be stored in separate buffer 45. Buffer 45 need not be on the storage. It is typically stored on the memory. Generally, the freezing of the memory occurs from the slowest memory to the fastest memory. For example, all levels of memory may be frozen including cache levels and memory registers.

The freezing of the memory and the writes to disk are typically limited to the operation of the virtual machine and generally do not affect the remaining operations of distributed network system 10. In most instances, the freezing is momentary and generally unnoticed. Further, any writes are usually immediately sent to buffer 45.

At block 84, the method copies or "clones" the memory content to a target system, thus creating the clone. In addition to the memory content, the method may further copy other required state information for running the clone such as the state of the devices connected to the virtual machine. The copy or clone may be generally referred to as a copy of the frozen state of the memory content.

However, in some instances, the memory content is not really "frozen" but merely copies in the current state. Alternatively, the method may attempt to minimize copying time by preloading the memory content in preparation for the copying process. However, this preloading may cause some of the memory content to be different upon the actual freezing of the content. As the hot clone is created, the method updates the copy or copies if not correct. For example, the clone may be copied in a "dirty" state that are nearly identical to the original virtual machine. Following the cloning operation, the method may update these clones as needed to correct the copy to be an identical clone.

At block 86, the method unfreezes the memory and the allows writes to the storage file. Typically, memory is unfrozen in a reverse process as it was frozen (e.g., unfrozen from fastest to slowest) Similarly, writes are unfrozen and permitted from the fastest to slowest writes. Further, the writes to a memory buffer such as buffer 45 are merged to the "frozen" memory of the original virtual machine.

Because one or more copies or clones were created in the hot cloning process, the subsequent writes to the storage file such as storage file 41 may create new blocks. As previously described, the cloning method may only copy a working set of the virtual machine such that any modification to the storage file 41, following cloning, creates a new block unique to that virtual machine.

Regarding the clones, each clone being a copy of the original undergoes a configuration process as shown at block 88. During the configuration process, each clone may automatically or with the aid of a user or host update unique characteristics for that clone. In one instance, a clone wizard may be utilized to prompt a user to provide information regarding the clones host name and Internet Protocol address such as in a system preparation process.

Once the clone has updated to reference information based on its own system, the clone may start or begin to run. At block 90, the new clone or clones and the original virtual machine share storage file 41. As such, the copy-on-write policy may be incorporated to the storage file.

At block 92, a determination is made whether a write to the shared block in storage file 41 is pending. If the clone or the original virtual machine has a write to the shared block in storage file 41, the clone or original virtual machine creates a new block, at block 94, in lieu of revising the shared block, commonly referred to a "copy on write."

For example, if clone 52 has a write to shared block in storage file 41, clone 52 may create a new block in storage file 41b. As such, this new block will be unique to clone 52 as the shared block will still be utilized by the other clones and original virtual machine.

Although the disclosed embodiments have been described in detail, it should be understood that various changes, substitutions and alterations can be made to the embodiments without departing from their spirit and scope.

What is claimed is:

1. A method for cloning a virtual machine from a source system to a target system in an information handling system, comprising:
   freezing writes to a storage file having storage blocks of an original virtual machine residing on a distributed network such that subsequent writes create new storage blocks for the original virtual machine, the distributed network using a first pointer to designate the location of the original virtual machine within a shared storage associated with the distributed network;
   freezing writes to a memory content for the original virtual machine such that subsequent writes to the frozen memory content are stored in buffers, wherein freezing writes to the memory content includes freezing all levels of memory starting with a slowest level of memory and finishing with a fastest level of memory;
   copying the frozen memory content including processor state and input/output state onto the target system wherein the copied memory content creates a clone of the original virtual machine;
   unfreezing the memory content of the original virtual machine by merging the writes stored in the buffers with the frozen memory content;
   unfreezing the writes to the storage file such that the original virtual machine and the clone both access the storage file;
   configuring the clone of the virtual machine based on unique characteristics for the clone of the original virtual machine;
   creating a second pointer, the second pointer designating the location of the clone of the original virtual machine within the shared storage of the distributed network; and
   creating a new storage block for any subsequent writes to the storage file whereby the new storage block is unique to the virtual machine causing the subsequent writes to the storage file.

2. The method of claim 1, wherein creating a copy of the memory content further comprises copying all levels of memory.

3. The method of claim 1, wherein configuring the clone of the virtual machine further comprises running a cloning wizard.

4. The method of claim 3, wherein the cloning wizard further comprises modifying an Internet Protocol (IP) address or a host name for the clone on the target system.

5. The method of claim 3, further comprising performing a system preparation on the clone to remove information that will remain unique to the original virtual machine.

6. The method of claim 1, further comprising finishing all active transactions prior to cloning the original virtual machine.

7. The method of claim 1, wherein the copying the memory content further comprises copying certain state information including the state of associated virtual devices to the clone of the virtual machine on the target system.

8. The method of claim 1, further comprising performing the cloning of the virtual machine in real-time.

9. An information handling system, comprising:
   a distributed network including:
     a plurality of processors coupled to a processor bus;
     a memory coupled to the processor bus;
     a shared storage system operably coupled to the processors and the memory;
     the shared storage system including a target system and a source system having a virtual machine;
     the virtual machine including a storage file having a plurality of storage blocks;
     a first pointer designating the location of the virtual machine within the shared storage system; and
   the processors operable to execute instructions for cloning the virtual machine from the source system to the target system, comprising:
     freezing writes to the storage file wherein subsequent writes create new storage blocks for the virtual machine;
     freezing a memory content including processor state and input/output state for the virtual machine whereby subsequent writes to the frozen memory content are placed in buffers, wherein freezing the memory content includes freezing all levels of memory starting with a slowest level of memory and finishing with a fastest level of memory;
     copying the frozen memory content onto the target system to create a clone;
     unfreezing the memory content of the virtual machine by merging the writes placed in the buffers with the frozen memory content;

unfreezing the writes to the storage file such that the virtual machine and the clone both access the storage file;

configuring the clone based on unique characteristics for the clone;

creating a second pointer, the second pointer designating the location of the clone within the shared storage of the distributed network; and creating a new storage block for any subsequent writes to the storage file whereby the new storage block is unique to the virtual machine causing the subsequent write to the storage file.

10. The information handling system of claim 9, wherein creating a copy of the memory content further comprises copying all levels of memory (cache level and memory registers).

11. The information handling system of claim 9, wherein copying comprises using a copy on write command.

12. The information handling system of claim 9, wherein the information handling system comprises a distributed network system.

13. The information handling system of claim 9, wherein the instructions further comprise completing active transactions prior to cloning the virtual machine.

14. A tangible computer-readable storage medium having computer-executable instructions stored therein, the instructions for performing a method of cloning a virtual machine from a source system to a target system in an information handling system, comprising:

instructions for stopping writes to a storage file having storage blocks of an original virtual machine and freezing writes to a memory content for the original virtual machine such that subsequent writes to the frozen memory content are stored in buffers;

instructions for copying the frozen memory content such that copying starts with a fastest level of memory and finishes with a slowest level of memory onto the target system wherein the copied memory content creates a clone of the original virtual machine;

following the instructions for copying, instructions for unfreezing the writes to the storage file and unfreezing the memory content of the original virtual machine by merging the writes stored in the buffers with the frozen memory content;

instructions for sharing the storage file between the original virtual machine and the clone of the original virtual machine;

instructions for configuring the clone of the virtual machine based on unique characteristics for the clone of the virtual machine;

instructions for creating a pointer, the pointer designating the location of the clone of the virtual machine within the information handling system; and instructions for creating a new storage block for any subsequent writes to the storage file whereby the new storage block is unique to the virtual machine causing the subsequent write to the storage file.

15. The tangible computer-readable storage medium of claim 14, further comprising instructions for performing a system preparation on the clone to remove information that will remain unique to the original virtual machine.

16. The tangible computer-readable storage medium of claim 14, wherein the levels of memory include cache levels of memory and memory registers.

17. The tangible computer-readable storage medium of claim 14, wherein the target system may be the same as the source system.

* * * * *